United States Patent [19]

Kachun

[11] 4,434,472

[45] Feb. 28, 1984

[54] GENERAL PURPOSE DATA TERMINAL SYSTEM WITH DISPLAY LINE REFRESHING AND KEYBOARD SCANNING USING PULSEWIDTH MODULATION

[75] Inventor: Lee Kachun, Fremont, Calif.

[73] Assignee: Falco Data Products, Sunnyvale, Calif.

[21] Appl. No.: 220,279

[22] Filed: Dec. 29, 1980

[51] Int. Cl.[3] .......................... G06F 3/02; G06F 3/153

[52] U.S. Cl. ................................ 364/900; 340/365 E; 340/365 S; 340/799

[58] Field of Search ..................... 364/900 MS FILE; 340/798, 799, 365 E, 365 S

[56] References Cited

U.S. PATENT DOCUMENTS

| | | | |
|---|---|---|---|
| 4,104,624 | 8/1978 | Hamada | 340/799 X |
| 4,190,826 | 2/1980 | Alles | 340/365 S |
| 4,194,188 | 3/1980 | Marino et al. | 340/365 S X |
| 4,200,913 | 4/1980 | Kuhar et al. | 364/900 |
| 4,203,107 | 5/1980 | Lovercheck | 364/900 X |
| 4,222,038 | 9/1980 | Magerl | 340/365 S |
| 4,237,543 | 12/1980 | Nishio et al. | 364/900 |

*Primary Examiner*—Raulfe B. Zache

*Attorney, Agent, or Firm*—Limbach, Limbach & Sutton

[57] ABSTRACT

A General purpose terminal system included microprocessor-controlled line refresh apparatus wherein an internal address table is updated, in real time, to control the line refreshing of the CRT display; a pulse width modulated serial keyboard scanning apparatus; and smooth scrolling/double-height/double-width apparatus.

12 Claims, 10 Drawing Figures

GENERAL PURPOSE TERMINAL SYSTEM

CHARACTER LINE TABLE

| CHARACT. LINE NO. | ADDRESS | LINE ATTRIBUTES |
|---|---|---|
| 1 | | |
| 2 | | |
| 3 | | |
| 4 | | |
| . . . | | |
| 25 | | |

SMOOTH SCROLL

GENERAL PURPOSE DATA TERMINAL SYSTEM WITH DISPLAY LINE REFRESHING AND KEYBOARD SCANNING USING PULSEWIDTH MODULATION

BACKGROUND OF THE INVENTION

The present invention relates generally to general purpose data terminals and, more particularly, to visual display control and data entry apparatus for use in general purpose terminals.

In the general purpose data terminal art, a general purpose terminal is used in conjunction with a host computer or microcomputer. The general purpose terminal provides keyboard means for entering data which is then relayed to the computer, and display means for displaying the data before it is relayed to the computer. The general purpose terminal also receives data from the computer and provides visual display means for display of information received from the computer. Some general purpose terminals have limited data manipulation capabilities.

The basic elements of the general purpose terminal include a received-character buffer, a transmit-character buffer, a visual display means, typically a cathode ray tube (CRT) for displaying the contents of a received character buffer, a keyboard for entering data into a transmit character buffer, and interface circuitry for communicatively coupling the received character buffer and transmit character buffer to a computer.

Communication between the data terminal and the computer is typically performed using standard universal synchronous asynchronous receiver transmitter (USART) links. When a USART link is used, communication between the data terminal and the computer is in serial data format.

Prior art general purpose terminals are typically limited to the transmit/receive functions described above. The art has been generally directed towards designing terminals strictly for transmission or reception of data from a host computer. As such, they are not designed to function directly with peripheral devices, such as floppy disk controllers. Therefore, prior art general purpose terminals typically access peripherals through the host computer. As such, valuable computer time must be used in order to access the peripheral. Additionally, software must be generated to permit the host computer to interface between the peripheral and the general purpose terminal. This results in higher cost and complexity.

Other areas of design emphasis in the general purpose terminal art have included visual display apparatus for the terminal.

In some terminals, the visual display is controlled largely by a CRT controller. Data entered displayed on the CRT is stored in a raster memory, in sequential fashion. The raster memory then contains all information being currently displayed on the display screen, and is addressed according to the location of the first bit of screen data. The CRT controll periodically reads out, or scans, the raster memory in order to refresh the visual display. Typically, this line refreshing is performed every 1/30 to 1/60 of a second. Line refreshing is required at these rates so that the display image appears constant and non-flickering to the human eye.

Data output from the raster memory is supplied to character generating means and video generating means which convert the binary data representing a particular character into a two-dimensional dot array (a number of rows high and a number of columns wide) for display on the CRT screen. Typically, up to eighty of these two-dimensional dot arrays can be strung together and displayed as a character line in the visual display.

In general, the visual display on a CRT screen is comprised of a number of horizontal scan lines spaced very close together so as to appear as a solid image. A character line is comprised of a number of scan lines. Data from the character generating means is generated scan-line by scan-line so that for a character line, the character generator will first send out the top scan line of the character line, then the next scan line of the character line, and so on until all scan lines which make up the character line have been sent.

Typically, the CRT controller also supplies a row count signal which tells the character generator which scan line of the current character line is being processed.

A character counter, starting at the location of the first bit of screen data contained in the raster memory, sequentially increments the address so that, as the scanning proceeds from left to right, the address of the character which is to occupy the particular character line position is sent to the raster memory. Data generated by the raster memory in response to this address is then sent to the character generator for generation of the data pattern, corresponding to the current scan line, for the particular character. The character counter is sequentially incremented in this manner until all of the screen data in the raster memory has been read out.

In such a configuration, line refreshing is performed on a full screen basis. That is, when the screen display is sought to be changed, the whole screen data section in the raster memory is rewritten. This results in added delay in modification of the display, as well as in increased difficulty in implementing any additional display features such as smooth scrolling, and double-height, and double-width characters. Control of the raster memory by the CRT controller as above lacks flexibility.

With the advent of the LSI microprocessor, more of the control function has been shifted from hardwired logic control to microprocessor control. Systems using microprocessors require external read-only memory (ROM), external random access memory (RAM), working memory, and associated interface circuitry.

Line refreshing in the typical microprocessing system is accomplished, when character attributes such as smooth scrolling and double-height and double-width, are desired, through the interaction of the central processing unit (CPU) of the microprocessor with the CRT controller, a translate RAM, a line counter, a screen memory RAM, and an associated multiplexer. In a non-smooth scrolling mode, the CRT controller provides the translate RAM with the starting address of the screen data that is stored in the screen memory RAM. The translate RAM, in response to CPU commands relays the character line address desired to be scanned to a line counter. The line counter sequentially increments the address to interrogate the screen memory RAM and to cause the desired data to be relayed to the CRT for display.

When the smooth scrolling feature is desired, the CPU supplies the translate RAM with the address of the character line at which the display is to start. The translate RAM then performs the address translation operations required for scrolling the addressed scan line data.

A multiplexer means is used to select between address information from the CPU and address information from the CRT controller. The selected address information is then routed to the translate RAM. The address information from the CRT controller is used when a normal display mode is desired. Additionally, when address data is multiplexed into the translate RAM, data emerging from the translate RAM and inserted into the line counter must be multiplexed with data coming from the CPU.

The above configuration requires the use of numerous additional hardware, as well as increases the complexity of control of the line refresh feature.

In the past, the ease with which a double height or double width character display feature could be implemented depended upon the type of line refresh technique used. When the CRT controller controlled the screen memory RAM directly by supplying the starting address of the screen information in the RAM, and then consecutively reading out the data, double height and double width features could not easily be implemented. For the double height feature, the contents of the screen memory RAM were required to be read out into another memory means, operated upon to modify the data, and then read back into the screen memory RAM for display by the CRT controller.

When the CPU/translate RAM/CRT controller arrangement was used, (the translate RAM contained the line attribute information) the double height feature was therefore implemented according to the contents of the translate RAM. As such, line attribute information within the translate RAM was required to be modified by the CPU, before a particular line of data could be displayed in modified attribute form.

In the past, information transfer between keyboard and main terminal has often been performed on a parallel data basis. For example, information was often communicated between keyboard and the main terminal body using parallel bit transfer. A four bit parallel address would be sent out to address a column of the keyboard, and four bit parallel data would be received from the keyboard in response. Three bits of this received data would represent the rows of the keyboard array, in which a key had been pushed. The fourth bit represented the logical Oring of the three bit row data in order to derive an interrupt signal to the terminal to signal that a key was ready for processing. In this configuration, serialization of the communication process was difficult.

Serial keyboard scanning in the typical general purpose terminal normally requires that substantial circuitry be resident within the keyboard in order to decode address data and interpret and encode the keyboard data for relay to the main terminal. As a result, numerous integrated circuits and associated hardware were considered a necessary part of the keyboard circuitry. The cost for such additional circuitry was high. At the very minimum, communication between the keyboard and the main terminal was performed using an output line for sending data in serial form, a clock line for receiving synchronizing pulses from the main terminal, and a control line for sending interrupt signals to the main terminal and for receiving control signals from the main terminal.

SUMMARY OF THE INVENTION

The foregoing and other problems of prior art general purpose terminals are overcome by the present invention of a general purpose terminal system, including serial keyboard scanning apparatus, line refresh apparatus and line attribute apparatus for use in general purpose terminals.

The line refresh apparatus includes addressable screen memory means for storing display data, a temporary storage means for accepting and storing address information corresponding to the display data line stored in the screen memory means, incrementing means coupled to the memory means and supplied with the display data line address from the temporary storage means, and a microprocessor means for supplying the display data line address to the temporary storage means on a character-line-by-character-line basis, in real time so that the line refresh data supplied to the character generator may be varied by real time manipulation of the line address data by the microprocessor means.

The smooth scroll apparatus includes a microprocessor to control the character attribute data supplied by a counter to the character generator, so that the character generator data output for a particular character line may be selected to begin at any point within the character line structure.

The double-height/double-width apparatus comprises, for the double-height feature, an adder means responsive to the character attribute data from the microprocessor and to a double-height control signal, to double the number of times a particular scan line for each character line is scanned across the display screen. The double-width apparatus comprises means for causing the clock rate, at which a scan line is displayed on the display screen, to be doubled.

The apparatus for serially scanning the keyboard comprises means for generating a pulse width modulated serial address, corresponding to a particular key position in the keyboard array. The apparatus generates a similar address for each key within the keyboard. When any key addressed by the pulsewidth modulated serial address is depressed, a non-zero voltage is supplied by the keyboard to the microprocessor. In order to scan the whole keyboard, the apparatus sequentially sends the pulse width modulated serial address for each of the keys within the keyboard, and determines whether a non-zero voltage level (in response to each of the addresses) is returned by the keyboard.

In the line refresh apparatus, the microprocessor maintains a table of line addresses for the visual display refreshing, and supplies the line address for the next scan, in real time. This increases flexibility in the display of data and does not require that the location of data stored in the screen memory RAM be changed. Because the data is addressable line by line, the modification of data within a particular line may be performed independently of data in any other line, and independently of the address of data within any other line. Additionally, fewer hardware are required to implement the line refresh apparatus of the present invention.

In the past, implementation of line refreshing in the above manner has been avoided due to the complexity involved in having the microprocessor maintain such a line address table, and to the requirement that the microprocessor supply the real time scan line data to the screen memory. To do so would require that the microprocessor dedicate a significant proportion of time to the line refresh function. As such, the implementation of other features would suffer. In the present invention, the timing problem has been overcome through the judicious selection and arrangement of functional components, as well as novel manipulation of character line information by the microprocessor.

In addition, the configuration of the line refresh apparatus in the present invention provides for simpler implementation of smooth scroll, double-height and double-width character attributes, as well as more flexibility in data handling in the transmit, receive and peripheral interaction functions described previously.

It is therefore an object of the present invention to provide a line refresh apparatus for use in a general purpose terminal system for refreshing a CRT display screen, on a line-by-line basis, by real time address manipulation.

It is a further object of the present invention to provide smooth scrolling apparatus for use in a general purpose terminal system wherein a microprocessor controls the scan line address supplied to a counter, which then designates the beginning scan line output by a character generator for a given character line scan.

It is a still further object of the present invention to provide double-height/double-width apparatus for use in a general purpose data terminal system for increasing the height of the displayed character line by use of an adder means which causes the character generator to scan a particular scan line twice; and to provide double-width character apparatus by causing the clock rate supplied to a scan line counter and to a video generator, to double in period.

It is another object of the present invention to provide serial scanning apparatus for scanning the keyboard of a general purpose data terminal system, wherein a pulse width modulated serial address is sent to the keyboard and a voltage level is received in response.

It is a still further object of the present invention to provide a general purpose data system which is low in cost without sacrificing the flexibility to interaction directly with other peripherals, such as floppy disk controllers.

The foregoing and other objects, features and advantages of the invention will be more readily understood upon consideration of the following detailed description of certain preferred embodiment of the invention, taken in conjunction with the accompanying drawings.

BRIEF DESCRIPTION OF THE DRAWINGS

FIG. 5 has intentionally been left out.

FIG. 7 is an illustration of the display data line address table maintained by the microprocessor as a part of the line-by-line refresh apparatus.

DETAILED DESCRIPTION OF THE PREFERRED EMBODIMENT

Figure 1:
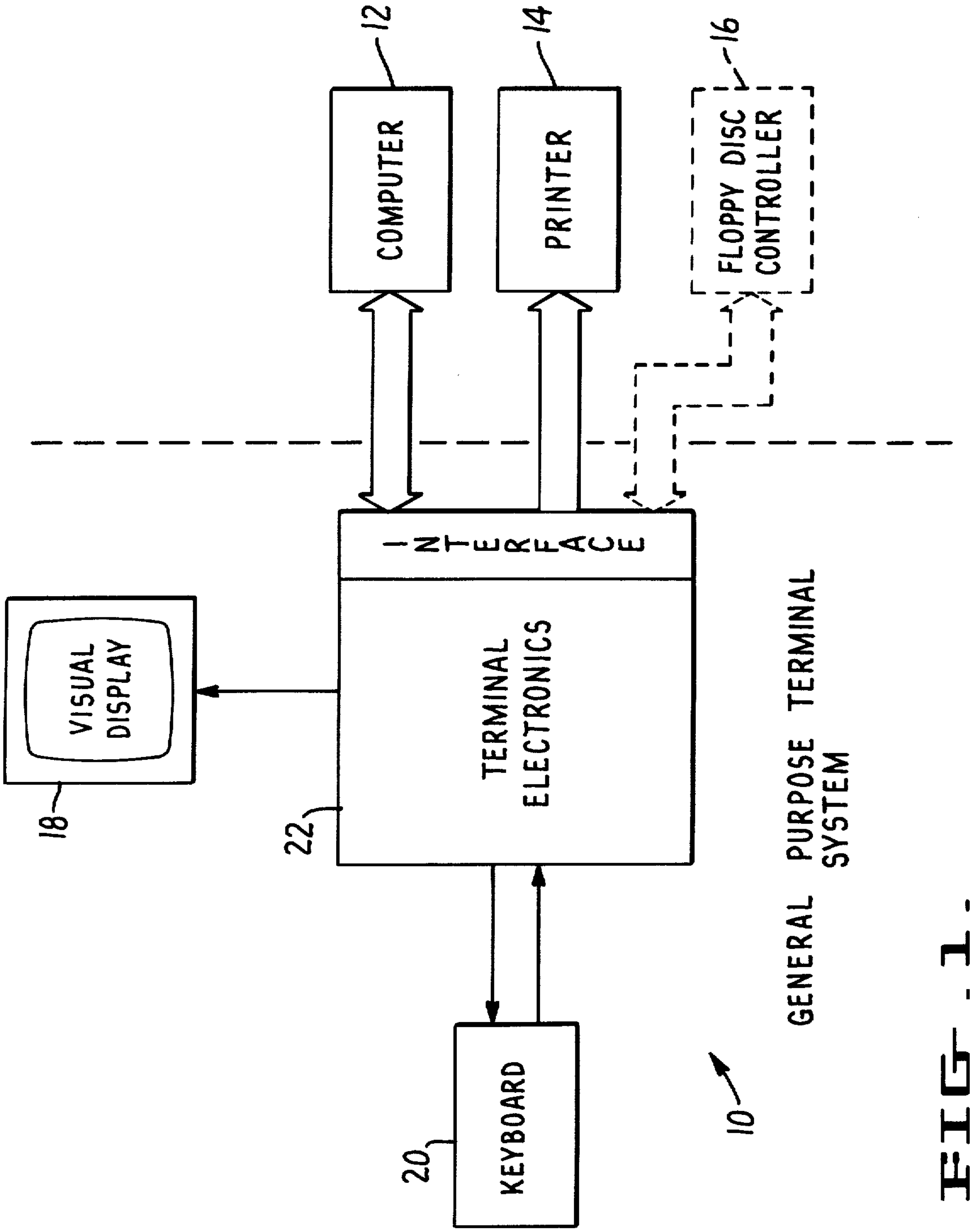
FIG. 1 is a block diagram of the functional relationship between a general purpose data terminal system and a computer, a printer, and other peripherals, such as a floppy disk controller.

Referring to FIG. 1, the functional relationship of the general purpose terminal system 10 is shown with respect to a computer 12, a printer 14, and an additional peripheral (for example, a floppy disk controller, shown in dotted lines) 16. The computer 12, receives data from the general purpose terminal system and transmits data to the general purpose terminal system 10. The printer 14, receives data and control signal from the general purpose terminal system and prints out the data according to the control signals. Additional peripherals such as a floppy disk controller 16 can be accommodated.

Turning to the elements of the general purpose terminal, the elements include a visual display 18, a keyboard 20, and terminal electronics 22. The visual display 18 serves as a means for the user to monitor the operation of the terminal. The keyboard 20 is a means for user transmission of data in to the terminal 10, and thence to the computer 12, the printer 14, and/or the other peripherals 16.

In addition to providing interfaces for communication with the computer 12, the printer 14, and other peripheral 16, the terminal electronics 22 includes controllers, memory, address buses, data buses, and control buses, as well as the various circuitry necessary to implement the line refresh, double-height/double-width, smooth scrolling, and serial keyboard scanning features of the present invention.

Figure 2:
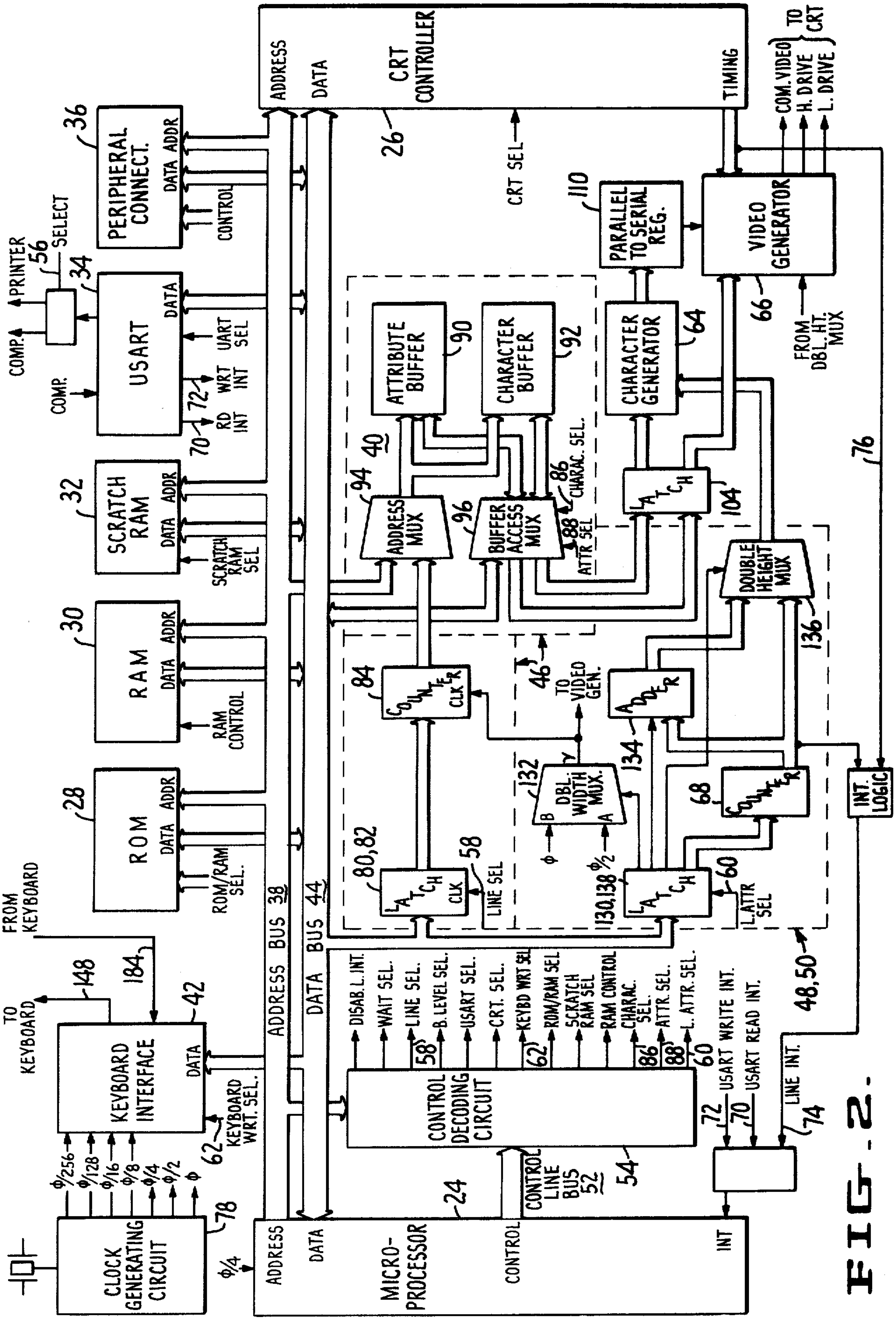
FIG. 2 is a simplified functional block diagram of the electronics of the present invention.

Referring more particularly to FIG. 2, these various elements are shown in greater detail. In the present invention, the controller means for the general purpose terminal include a microprocessor 24, and a CRT controller 26. Memory means include a read-only memory (ROM) 28 for storage of system programming, a random access memory (RAM) 30 for data, address, and miscellaneous information storage, and a scratch RAM 32 for use by the microprocessor as a working memory.

Universal synchronous asynchronous receive transmit (USART) device 34 is provided for interface between a computer 12 and a printer 14. In addition, external buffering 36 is provided for connection to other peripherals, such as a floppy disk controller 16. The address bus 38 provides address information between the microprocessor 24 and the ROM 28, the RAM 30, the scrath RAM 32, the external buffering 36, and the CRT controller 26. The address information provided to the CRT controller 26 is supplied in connection with initial programming of the controller 26 when the general purpose terminal is first turned on. In addition, the address bus 38 provides address information to a screen memory RAM 40.

A data bus 44 provides data information to and from the microprocessor 24, the keyboard interface 42, the ROM 28, the RAM 30, the scratch RAM 32, the USART 34, the external buffering 36, and the CRT controller 26. The data supplied to the CRT controller 26 is provided in connection with the initial programming of the controller, when the general purpose terminal system is first turned on. In addition, the data bus 44, provides data information to the screen memory RAM 40, as well as the line refresh apparatus 46, the double-height/double-width apparatus 48, and the smooth scrolling apparatus 50.

The control line bus 52 provides control data from the microprocessor 24 to a control decoding circuit 54. The control decoding circuit decodes the control data and supplies the various terminal elements with control signals as directed by the microprocessor 24. Among those control signals are included the select signals for the ROM 28, the RAM 30 and the scratch RAM 32. The control decoding circuit 54 also provides control signals to the USART 34 to select the USART write or read modes, and to select between data transmission to the computer 12, or the printer 14 through printer select signal 56. The decoder 54 also provides control signals for selection for the various line attribute functions, for example: (1) the line select signal 58 directs the line refresh apparatus to load in the address of the next line to be scanned, the address being present on the data bus 44; (2) the line attributes select signal 60 directs the smooth scroll apparatus and the double-height/double-width apparatus to load in the line attribute data present on the data bus 44; (3) the keyboard write select signal 62 enables the keyboard scanning apparatus for the serial scanning of the keyboard.

Also included in the terminal electronics 22 are a character generator 64, a video generator 66, and various miscellaneous circuitry.

The microprocessor 24 receives interrupt signals from the USART 34, the character line counter 68 (part of the smooth scrolling circuitry 50) and the CRT controller circuitry 26. These interrupt signals inform the microprocessor 24 that real time processing of data is required. The interrupt signals involving the USART 34 are the read-interrupt signal 70 and the write-interrupt signal 72. When the microprocessor 24 receives a read-interrupt signal 70, the microprocessor stops the program that it is currently processing, receives data from the USART 34, and writes the data in a temporary buffer. When this write operation is completed, the microprocessor resumes processing of the current program at the point where it left off.

When the microprocessor 24 has completed processing of sufficient characters for transmission to the computer 12, the printer 14, or other peripheral 16, the microprocessor 24 interrupts processing of its current program and transmits data into a temporary buffer for transmission by the USART 34.

When the microprocessor 24 receives a line interrupt signal 74 from the smooth-scrolling counter 66, or a line interrupt signal 76 from the CRT controller, the microprocessor stops its current program processing to load in the address of the display data line which is to be scanned next by the line refresh apparatus. After the address is loaded into the line refresh apparatus, the microprocessor 24 resumes processing of its current program at the point where it left off.

The CRT controller 26 provides synchronization signals for the video generator 66 to synchronize the video display 18.

A clock generating circuit 78 provides the timing reference for the system, and has a basic reference frequency denoted by the symbol $\phi$.

Figures 2, 4:
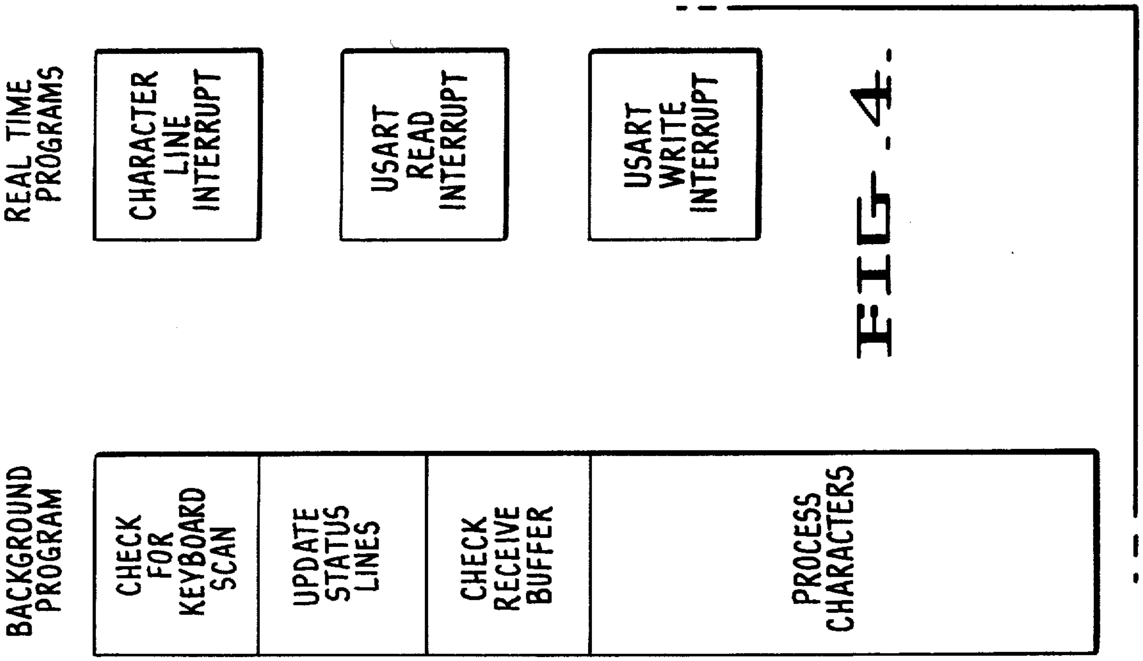
FIG. 4 is a functional block illustration of the software structure of the microprocessor, and of the real time and background programs.

FIG. 4 illustrates the priorities assigned to the various microprocessor tasks. Unless an interrupt is received from a real time program, the microprocessor will process the background program. The real time programs are kept short to increase flexibility. The line refresh function involved a real time interrupt, while the keyboard scan is treated as a background function.

In the above description, the general concept and interrelationship of the element described are well-known in the art; it is the implementation of the various elements and the combination of the elements which comprises this new and novel general purpose data terminal system.

LINE-BY-LINE REAL TIME REFRESH

Figure 3:
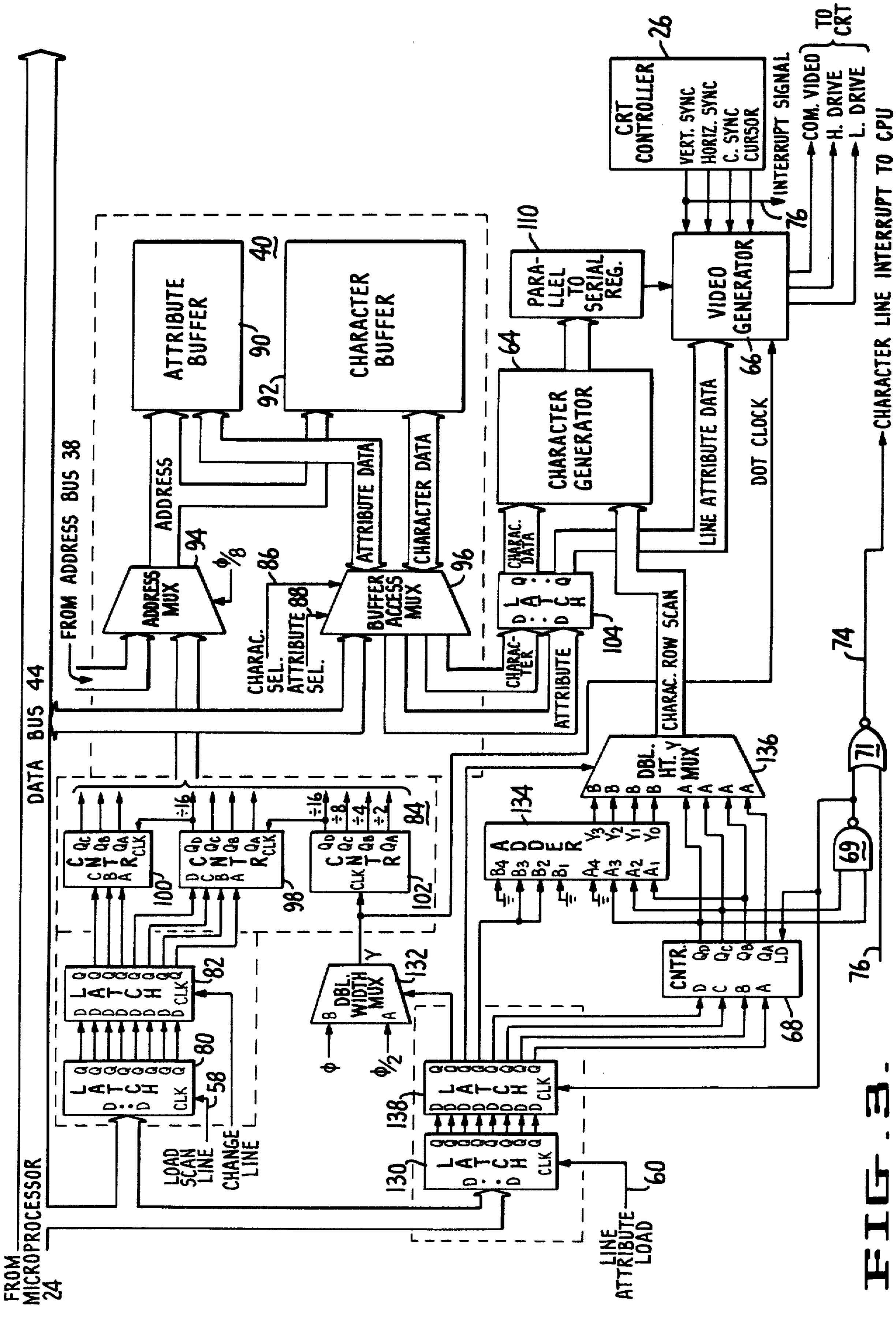
FIG. 3 is a simplified block diagram of the line refresh apparatus, the smooth scrolling apparatus, and the double-height/double-width apparatus.

Referring now more particularly to FIGS. 2 and 3, the line-by-line refresh circuitry will be described. The apparatus comprises a microprocessor 24, latches 80 and 82, a screen memory RAM 40, and a scan counter 84, along with connections to the data bus 44, the address bus 38, and the control line decoder 54.

The control lines from the control line decoder 54 include scan line select 58 (which connects to the clock input of latch 80), character select signal 86 which connects to circuitry within the screen memory RAM 40, and attribute select signal 88 which also connects to circuitry within the screen memory RAM 40.

Screen memory RAM 40 comprises an attribute buffer 90, a character buffer 92, an address multiplexer 94, and a buffer access multiplexer 96.

The data bus 44 connects to the input of latch 80. The outputs of latch 80 connect to the inputs of latch 82, and the outputs of latch 82 are supplied to the scan line counter 84. The scan line counter 84 is comprised of 3 individual counters. Two of these counters are presettable binary counters 98 and 100. The third counter is a four bit ripple counter 102. Counter 100 is preset to the binary number corresponding to the three most significant bits in latch 82, i.e. the three most significant bits of the address. Counter 98 is preset to the binary number representing the four least significant bits of the address which is present in latch 82. Ripple counter 102 is supplied with a clock $\phi$, or $\phi/2$, (depending upon the double-width mode) to produce outputs corresponding to the input frequency divided by two, divided by four, the frequency divided by eight, and divided by sixteen.

The counter 102 output corresponding to the input clock frequency divided by 16 is routed to the clock input of counter 98. Likewise, the counter 98 output corresponding to divide by 16 is applied to the clock input of counter 100. The outputs from counter 100, counter 98, and counter 102 are applied in parallel fashion to screen memory RAM 40. As the clock supplied to counter 102 is incremented, the address represented by the outputs of counter 100, 98, and 102 is incremented by 1 bit. As such, the scan counter 84 causes the address it initially received from the latch 82 to be incremented to provide the address for each character in the particular character line to be scanned in a sequential fashion.

The output of scan counter 84 is received in the screen memory RAM 40 by address multiplexer 94. Address multiplexer 94 also receives address data from the address bus 38. The output of address multiplexer 94 is switched between address bus 38 and character scan line address at a rate of $\phi/8$. The output of the address multiplexer 94 is applied to both the attribute buffer 90 and the character buffer 92. In response to this address information, the attribute buffer 90 supplies attribute data corresponding to the character line to the buffer access multiplexer 96. Likewise, in response to the address supplied by the address multiplexer 94, the character buffer supplies character data to the buffer access multiplexer 96.

The character select line 86 and the attribute select line 88 from the control signal decode circuitry 54 apply control signals to the buffer access multiplexer 96 so that the attribute data and character data received from the attribute buffer 90 and the character buffer 92 are properly synchronized with the addresses being supplied by the address multiplexer 94.

The buffer access multiplexer 96 also receives data from and transmits data through the data bus 44. Exchange of data between the data bus 44 and the buffer access multiplexer 96 is conducted during the write cycle of the screen memory RAM operation.

The character and attribute data output by the buffer access multiplexer 96, in response to the character select signal 86 and attribute select signal 88, are supplied to a latch 104. The output of latch 104, corresponding to the character data, is routed to a character generator 64. The output of latch 104 corresponding to line attribute data is routed to a video generator 66.

The character generator 64 generates, for each set of character data applied to it by latch 104, a number of strings of data, each string corresponds to one row of a twelve-row block, which, taken together forms, the visual image of the desired character. The choice of a twelve-row block dictates that there be a twelve scan line character line. Parallel to serial shift register 110 converts the character generator data from parallel to serial form for input into the video generator 66. The video generator 66 receives the serial data from register 110, the line attribute data from latch 104, and the synchronizing signal from CRT controller 26 to generate composite video, horizontal drive, and line drive signals for application to the CRT 18.

Figure 6:
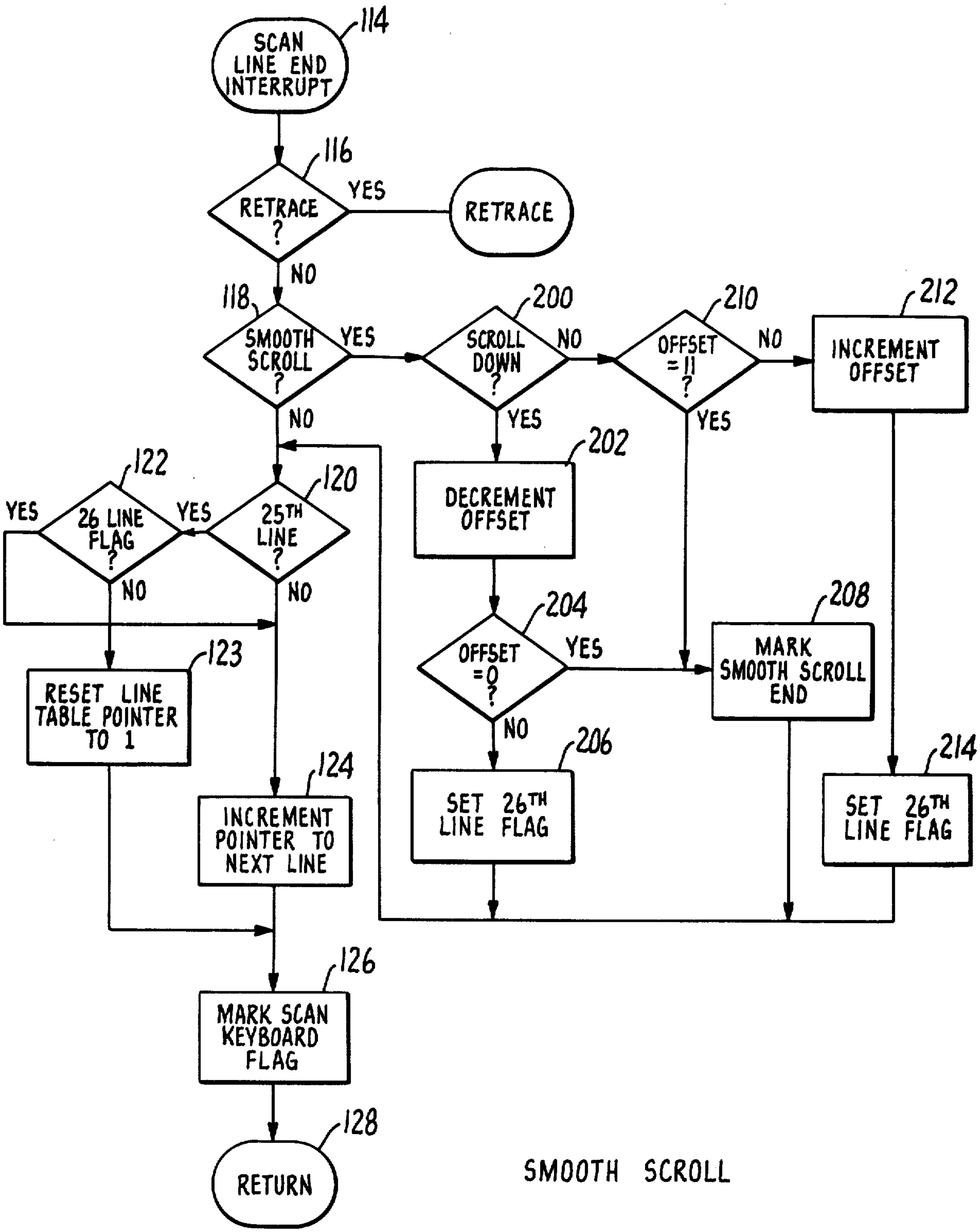
FIG. 6 is a flow diagram of the smooth scrolling microprocessor software.

Referring now to FIG. 6, the control by the microprocessor 24 of the line refresh apparatus will be discussed. When the microprocessor 24 receives a character line interrupt from either the CRT controller 26, or from the double height character apparatus, on line 74, it stops processing of its current program, step 114, and begins processing by the line refresh function.

The microprocessor 24 first checks to see whether or not the visual display 18 is in a vertical retrace mode, step 116. If it is not, the microprocessor determines whether a smooth scroll function is being implemented, step 118. If no smooth scroll function is being implemented, the microprocessor checks to see whether or not the visual display is scanning its 25th character line, step 120. If the 25th line is being scanned, the microprocessor determines whether there is a 26th line required for the particular refresh cycle, step 122. This condition arises when a scrolling operation has been ordered and a 26th line is required to be scanned. If the 26th line flag indicates such a condition, the microprocessor proceeds to increment the scan pointer to the next line in the character line table, step 124, see FIG. 7. The microprocessor will also increment the pointer to the next address in the character line table when, in step 120, the 25th line is not being scanned. If the 26th character line has been scanned the microprocessor resets the line pointer to the first line of the character line table, step 123.

FIG. 7 is an illustration of the character line table maintained by the microprocessor 24. The leftmost column corresponds to the order in which the character lines are to be scanned on the visual display 18. The address column corresponds to the starting address of the particular character line which will be scanned for the particular position. The rightmost column, line attributes, contains line attribute data for the corresponding character line, i.e., double-height/double-width flags and smooth scroll offset. In manipulating the order of the character line table, the microprocessor 24 shifts the address and line attribute data. For example, if the line in the No. 1 character line position was desired to be scanned instead in the 25th character line position, the microprocessor would shift the address presently in the character line 1 position, to the character line 25 position. The remaining addresses would be shifted upward one character line position so that the address which was previously in the second character line position would end up in the first character line position, etc. In this manner, the microprocessor could alter the image displayed on the visual display 18 by changing the order of the addresses in the character line table, as opposed to changing the order of the data in the character buffer 92. Because the character line table is maintained in this manner, the display can be changed with little difficulty on every refresh cycle.

In step 126, the microprocessor sets the keyboard scan flag in order to initiate the scanning of the keyboard. In step 128, the microprocessor returns to the point in the program at which it was operating when the line interrupt first arose.

This just described series of steps is repeated each time the visual display receives an interrupt on line 74. Therefore, on each cycle of this scan line interrupt sequence, the line pointer, which determines the address to be loaded into the line refresh latch 80 of the line refresh apparatus, is shifted along the character line table. The visual display screen is refreshed sequentially line by line. Because the line interrupt must be processed in real time, the microprocessor line interrupt cycle is kept short. The maintenance by the microprocessor of the character line table and the resulting reduction in external hardware required for line refreshing, as just described, is one advantage over prior line refresh apparatus. Increased flexibility of operation is also gained. The software controlling the microprocessor during this period is attached to this application as an Appendix.

SMOOTH SCROLLING

Referring to FIGS. 2 and 3 the smooth scrolling apparatus will now be described.

The smooth-scrolling apparatus of the present invention permits flexible control by the microprocessor over the rate at which the visual display image is shifted across the screen as well as the manner in which the shifting is accomplished.

In general, smooth scrolling involves the modification of the character line at the portion of the display screen where the display image is sought to be shifted. For example, when a new character line is sought to be inserted in the middle of a display, the user normally shifts the cursor to the position desired, and activates an insert command. In response to this insert command, the display is shifted downward, for example, with the portion of the display which is shifted, taking on the appearance of abruptly moving one character line downward. Internally, the microprocessor, in the case of the present invention, inserts in the character line table discussed above, a 26th line corresponding to a blank display. The addresses of the character which follow are then shifted in position, one character line downward. When smooth scrolling is implemented, the shifting is performed in a gradual fashion so that the visual display appears to shift downward one scan line at a time instead of a whole character line at a time.

Referring now to FIGS. 2 and 3, the smooth scrolling apparatus will be described. The smooth scrolling apparatus comprises a first latch 130, a second latch 138, a counter 68, and a controller, in the present invention the controller is microprocessor 24. The inputs of latch 130 are connected to the data bus 44, by which the microprocessor 24 supplies character attribute data, part of which is smooth scrolling data. This smooth scrolling data is an offset which is used to preset counter 68.

In a non-smooth scroll mode, counter 68 normally starts counting from one at the beginning of each character line. When the output of counter 68 reaches the quantity 12, gates 69 and 71 output an interrupt signal to the microprocessor on line 74, as well as a clock signal to latch 138. The interrupt signal to microprocessor 24 informs microprocessor that the current character line scan has come to an end and that the address of the next line to be scanned is required. The pulse applied to the clock input of latch 138 causes latch 138 to shift-in the next data set, supplied by latch 130.

When the smooth scrolling function is implemented, counter 68 is preset to the smooth scroll offset value. The data supplied by microprocessor 24 to latch 130 is a four-bit binary number. The quantity of which represents the number to which the counter 68 is preset. In this manner, counter 68 will cycle through fewer than 12 counts before the character line interrupt is sent to the microprocessor 24. Therefore, the character line which is subjected to this smooth scrolling, will have less than the full 12 scan lines displayed.

The output of counter 68 is supplied, through double-height multiplexer 136, to the character generator 64. The sequencing of the count from counter 68 dictates the particular scan line, which comprises the character line, which is to be output by the character generator for the particular count. Therefore, when the counter 68 counts from one through twelve, the character generator, in response to a one count outputs the top scan line of the character line. On the two count from counter 68, the character generator outputs the second scan line of the character line, and so on.

In order to produce a smooth scrolling effect, the microprocessor 24 causes the counter 68, on subsequent scans, to count from a preset value which is incremented or decremented with each additional scan. When the preset value is incremented, fewer scan lines are displayed with each additional refresh cycle. On the other hand, if the preset value to the counter 68 is decremented, then an increasing number of scan lines will be displayed with each successive refresh cycle.

In order to scroll the visual image downward, the microprocessor inserts a 26th line at the point at which the display is sought to be divided. For the first refresh scan, the smooth scroll offset assigned to the 26th line will be 11. Therefore, one blank scan line will be inserted on the first refresh cycle. At the same time, at the bottom of the character line table, the smooth scroll offset corresponding to the bottom, or 25th line, will be set to one. Therefore, only 11 scan lines of the 25th character line will be displayed before the microprocessor receives an interrupt to continue to the next character line.

On the next refresh cycle, the offset in the 26th line will be decreased to 10, and the offset in the 25th line will be increased to 2, and so on. In this manner, the 26th line offset will be incrementally decreased to zero, at which time a full blank line will have been inserted at the desired position, and the visual display will have appeared to have shifted smoothly downward. In fact, a 26th line had been inserted in the character line table, with the position of the addresses of the other character lines shifted downward, and with the offset assigned to the 26th and the 25th line constituting the quantities which were changed during the refresh cycle over which the display was shifted.

Referring to FIG. 6, a flow chart of the microprocessor operations during the smooth scrolling function is shown. At step 118, the microprocessor determines whether or not smooth scrolling is to be implemented by determining whether the smooth scroll offset corresponding to the current character line is non-zero. In step 200, the microprocessor determines whether the offset should be decremented for a downward scroll, or incremented for an upward scroll. If a downward scroll is called for, the microprocessor, in step 202, decrements the offset. In step 204, the microprocessor determines whether or not the offset has been decremented to zero, in which case the smooth scrolling would be at an end. If the offset was non-zero, the microprocessor would proceed to step 206 in which it would set the 26th line flag to indicate that a 26th line was still needed. From step 206, the microprocessor would proceed to step 120 and the rest of the scan line interrupt program.

If the offset in step 204 was determined to equal zero, the microprocessor in step 208 would mark smooth scroll end in the appropriate status position and continue to step 122 and the remainder of the scan line interrupt program.

If in step 200 the microprocessor determines that a scrollup operation was to be performed, the microprocessor would in step 210 determine whether or not the offset had already been incremented to 11, indicating the last line of the scan. If not, the microprocessor would increment the offset in step 212, then set the 26th line flag in step 214, and then proceed to step 120 in the rest of the scan line interrupt program. In the above manner, the microprocessor would each scan line interrupt increments or decrements the smooth scroll offset so as to cause on subsequent scans, the appropriate character lines to be shifted up in a smooth scrolling motion.

The software controlling the microprocessor during this period is attached to this application as an appendix.

DOUBLE-HEIGHT/DOUBLE-WIDTH

The double-height and double-width features of the present invention are implemented in the following manner. Referring to FIG. 3, latch 130 receives line attribute data from data bus 44 according to timing supplied by line attribute load signal 60. One bit of the received line attribute data determines whether or not a normal clock $\phi$ or a clock having half the frequency, $\phi/2$, will be supplied to the scan line counter 84 by double-width multiplexer 132. Double-width multiplexer 132 also supplies the selected clock to the video generator 108 to supply the dot clock timing. In such a configuration, the period over which the row data for a particular character is presented to the video generator, is doubled, thereby doubling the width of the character display.

Two other bits of data stored in the latch 130 control the double-height line attribute apparatus. The double-height line attribute apparatus is comprised of an adder 134 which is supplied with a double-height control signal from the latch 138. Latch 138 functions as a holding device so that latch 130 may be reset to receive line attribute data on the next line interrupt cycle from the microprocessor 24. Adder 134 is also responsive to the count signals emerging from the counter 68 (discussed previously). The output of the adder 134 is supplied to the B inputs of the double-height multiplexer 136. The A inputs to the double-height multiplexer are supplied from the smooth-scroll counter 68. The second double-height control signal from the latch 138 controls selection of the double-height multiplexer 136 inputs. The control signal supplied to the B inputs of adder 134 by latch 138 is connected so that when the line is at a high value, the adder 134 adds the quantity 6 to the quantity coming in at the A inputs. When the control line from latch 138 is zero, the adder adds zero to the A input quantity.

The other input lines, originating from the counter 68, are tied to the divide by 16, divide by 8, and divide by 4 outputs of the counter. These lines are tied to the four's place input, two's place input, and one's place input of the adder, respectively. When connected in this manner, the number presented to the adder 134 from the scan-line counter 140 is incremented from zero through seven, but at a rate which is one-half that at which the counter 68 is being incremented. For the first six scan lines of the double height character display, the control line from latch 138 into the B inputs of the adder 134 are kept low. The output of the adder 134 thus sequences from zero to six at one-half the rate of the counter 68.

Recall that the counter 68 counts from zero to twelve, after which it is reset to count from zero again. When this reset occurs, the latch 138 will be clocked to load in the next line attribute data from latch 130. In this new data set, the control line from latch 138 to the B inputs of adder 134 will be high, thereby adding 6 to the count coming from the scan line counter 140. In this way, the bottom half of the double height scan is generated.

During this whole period, the control line from latch 138 to the double-height multiplexer 136 remains high so that the count coming from the adder 134 is routed to the character generator 64.

KEYBOARD SCANNING

Figure 8:
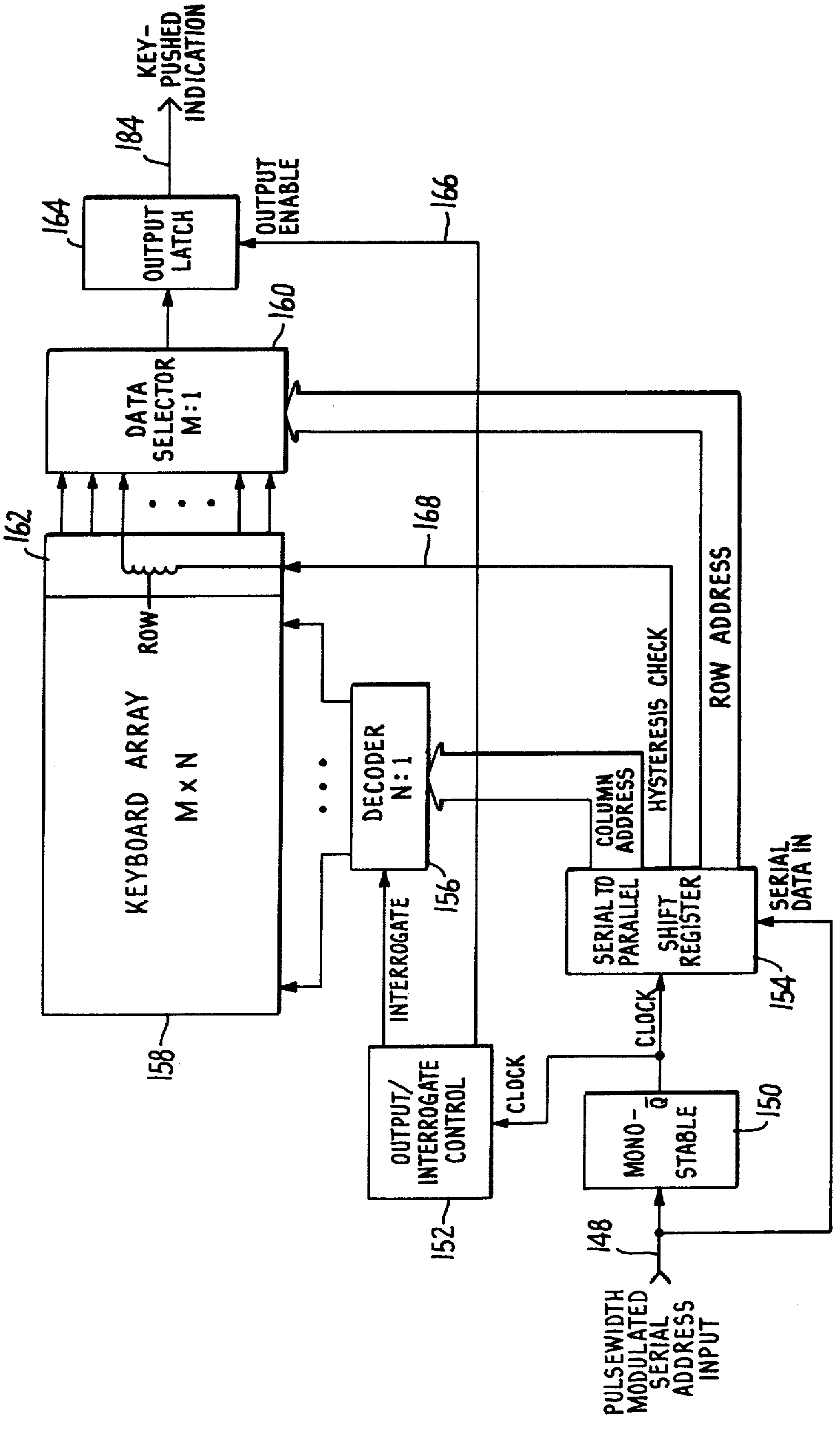
FIG. 8 is a simplified block diagram of the decoding circuitry for the keyboard scanning apparatus.
Figure 9:
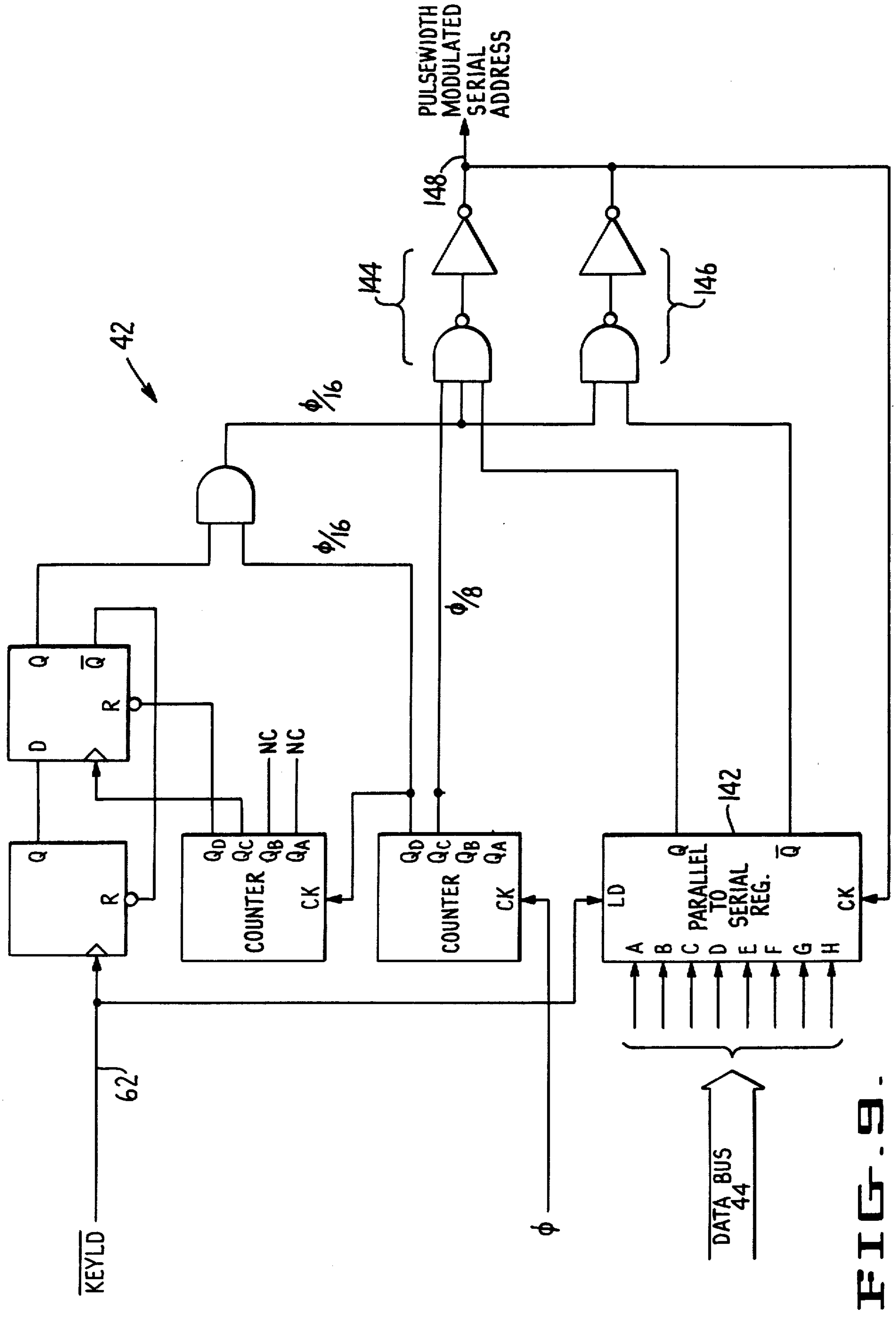
FIG. 9 is a simplified block diagram of the keyboard scanning address encoder.

Referring to FIGS. 8 and 9, the serial scanning of the keyboard 20 will now be discussed. FIG. 8 is a simplified block diagram of the circuitry contained in the keyboard itself. FIG. 9 is a simplified diagram of the encoding circuitry contained on the main board in the terminal housing. The encoding circuitry for the keyboard scan includes a parallel to serial shift register 142 which is supplied with parallel data from the data bus 44. The parallel shift register 142 is loaded with data in accordance with the key load signal 62, supplied from the control signal decode circuitry 54. The address data is in 8 bit parallel form. After it is loaded into the register 142, it is clocked out of the register in serial form by a clock having a frequency of $\phi/16$.

Logic circuitry combine the inverted and non-inverted output levels of register 142 to produce a pulse width modulated serial data stream corresponding to the desired key address. The non-inverted output of register 142 is connected to the input of an AND gate 144. A second input to AND gate 144 is supplied with a clock frequency of $\phi/16$ and a third input to AND gate 144 is supplied with a clock frequency of $\phi/8$. The inverted output of register 142 is connected to an input of AND gate 146 while the second input to AND gate 146 is supplied with a clock frequency of $\phi/16$. The outputs of AND gate 144 and AND gate 146 are connected together and thence supplied to the keyboard 20 on line 148. This combination produces a positive-going pulse, having a pulse width of $8/\phi$ when the output from register 142 is a one. When the output from register 142 is a zero, the signal supplied to the keyboard will be a positive pulse having a pulse width of $16/\phi$.

The data is shifted out of register 142 on the positive-going edge of the signal being supplied to the keyboard. This is accomplished by connecting the clock input of register 142, to the output line 148 supplied to the keyboard.

Figure 11:
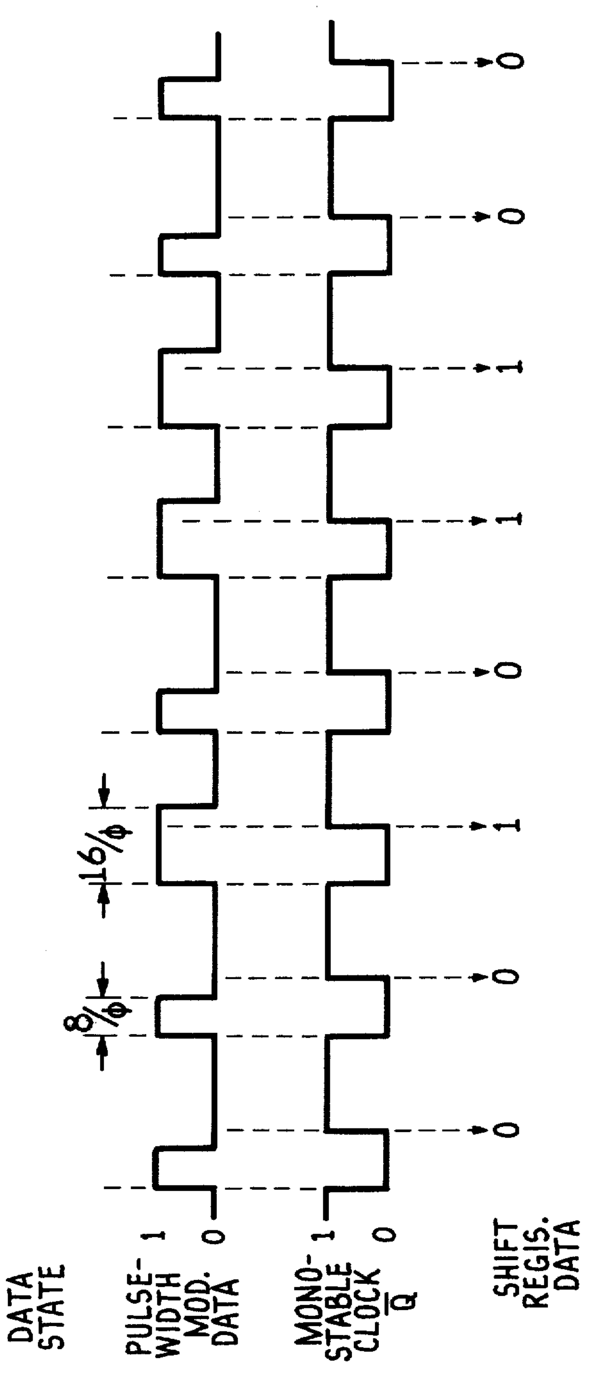
FIG. 11 is a simplified timing diagram for the demodulator in the keyboard scanning apparatus.

Referring now to FIG. 8, the decoding circuitry will be described. Monostable multivibrator 150 receives the pulsewidth modulated serial address input from the main terminal board on line 148, and, by edge triggering, derives the $\phi/16$ period of the pulse stream. This $\phi/16$ clock is supplied by the multivibrator to output/interrogate control circuitry 152 and a serial-to-parallel shift register 154. Serial-to-parallel shift register 154 is also supplied with the pulsewidth modulated serial address stream from line 148. Shift register 154 clocks-in the serial data according to the clock supplied by monostable 150. Since the clock input of register 154 is positive-going edge-triggered, data at the serial input to register 154 will be clocked in only when a positive-going edge is presented by the clock from monostable 150. The clock is therefore supplied from the inverting output of monostable 150. In addition, the pulsewidth of the circuit is adjusted so that it is greater than 8/100, but less than $16/\phi$. This results in the timing diagram shown in FIG. 11. The first line of the diagram corresponds to the data state; i.e., a one or a zero. The second line of the figure corresponds to the pulse width modulated serial address input. The third line corresponds to the clock derived by the monostable multivibrator 150. The fourth line corresponds to the data actually clocked in by register 154. From the diagram, it can be seen that the rising edge of the monostable clock signal is delayed long enough so that a pulsewidth that corresponds to a zero input at the register 154 will have ended by the time the rising edge of the monostable clock occurs. On the other hand, when the pulsewidth corresponding to a "ones" state is present at the input to register 154, the rising edge of the monostable clock will occur before the "ones" state pulsewidth ends.

Returning now to FIG. 8, output/interrogate control circuit 152, counts the clock pulses supplied by monostable 150 and outputs an interrogate signal to the decoder circuitry 156. Decoder circuitry 156 comprises an N to one decoder, which converts the parallel data supplied to it by shift register 154 into an output signal on a selected line. Also included in the decoder circuit 156 is an enable circuit responsive to the interrogate signal supplied by output/interrogate control circuitry 152 so that no decoder 156 output can be applied to the keyboard array 158 until an interrogate signal has been given. The parallel data supplied to decoder 156 from shift register 154 contains 4 bits of information. The remaining data supplied by the shift register 154 is applied to data selector 160 and to a hysteresis check feature 162.

Data selector 156 decodes the row address data supplied by shift register 154 to select the specified row of the keyboard array 158 for connection to the output latch 164. The output latch 164 is directed to load the value of the signal originating from data selector 160 by output enable signal 166, supplied by output interrogate control circuit 152.

The keyboard array 158 is a M row by N column array of inductive switches. That is, a key-down condition is indicated by a change in the inductance of the particular junction of row and column conductors corresponding to the particular key pushed.

The change in inductance is sensed in the hysteresis check circuitry 162. In that circuit, the output from each row of the keyboard array 158 is connected to a corresponding transformer so that a change in inductance along the row results in a change in inductance in the particular transformer. This change in induction is indicated at the input to the data selector 156 by a non-zero voltage. In order to double check that a key was actually pushed, the hysteresis check input is supplied on line 168. This line is tied to one end of each transformer in the hysteresis check circuitry 162. By raising the hysteresis check line 168 to a positive voltage level, the resulting output level from each transformer to the data selector will be increased. Therefore, error causing conditions such as switch-bounce are overcome. The output of latch 164 is supplied to the microprocessor on a single line 184.

Figure 10:
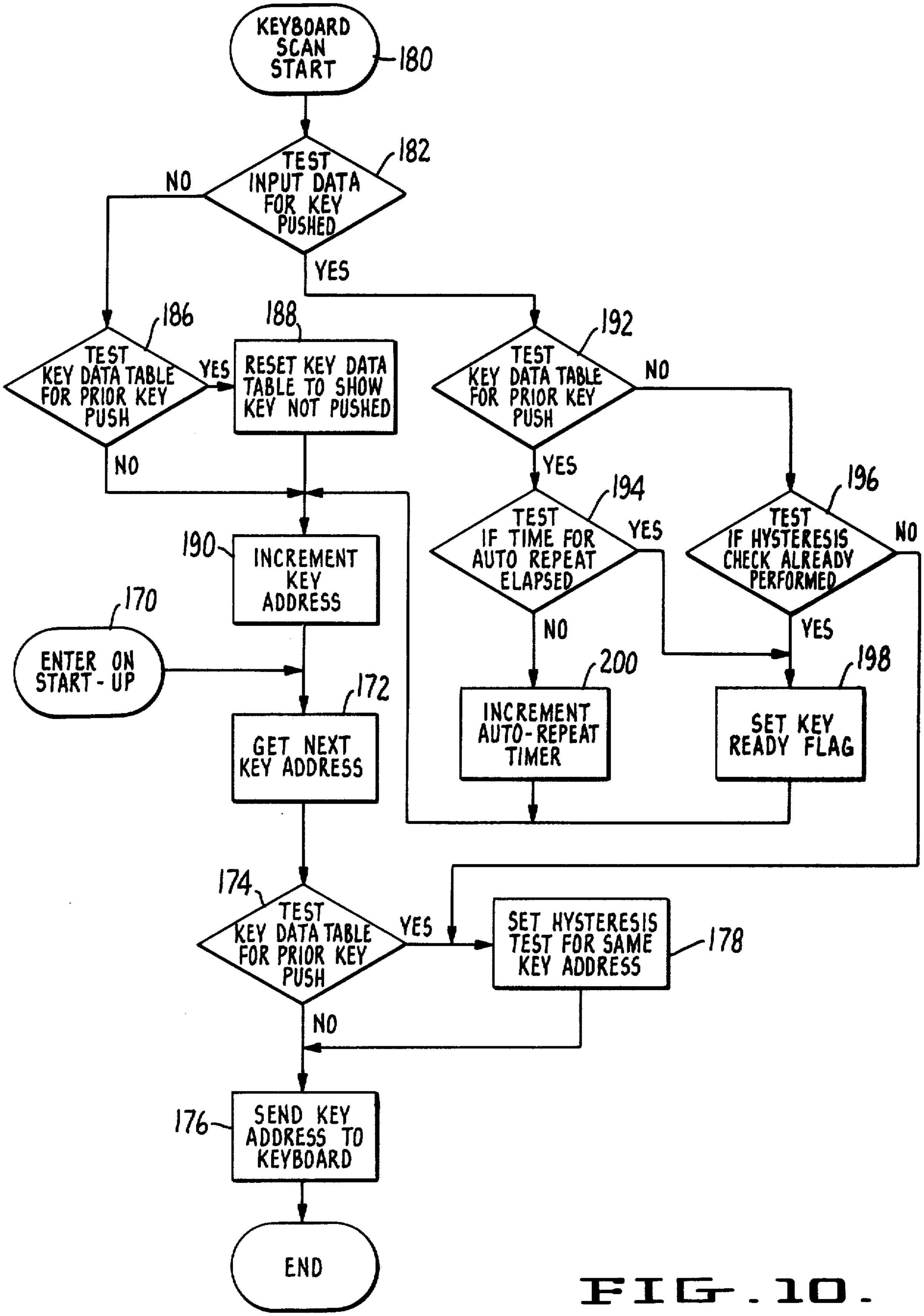
FIG. 10 is a flow diagram of the keyboard scanning apparatus microprocessor software.

Turning now to FIG. 10, the operations performed by the microprocessor 24 in connection with the serial keyboard scanning function will be described.

When the terminal is initially turned on, the microprocessor enters the keyboard scan cycle at step 170 to initialize conditions for the remainder of the cycle. At this point, the microprocessor first retrieves the next (in this case the first) key address to be scanned, step 172, from the RAM 30. The microprocessor 24 maintains a key status table within the RAM 30 in connection with the keyboard scanning function. In step 174, the microprocessor 24 examines the key data table, at the address obtained in step 172, to determine whether or not the particular key had been pushed during the prior cycle. In the initialization cycle, the key will not have been pushed previously. Therefore, the microprocessor will proceed on to step 176 wherein the microprocessor sends the key address to the encoding circuitry, FIG. 9, for encoding and transmission to the keyboard 20. Had the particular key been pressed on the previous cycle, the microprocessor would have proceeded to step 178 to implement the hysteresis check for the particular key address. After step 178, the microprocessor proceeds to step 176 to send the key address for encoding and transmission to the keyboard, and thence to the start of the keyboard scan operation, step 180.

At this point, microprocessor 24 proceeds to step 182 in which the microprocessor examines the data supplied by the keyboard to determine whether a non-zero value is present. If a zero value is present, the microprocessor proceeds to step 186 to determine from the key data table in the RAM 30, whether or not on the prior cycle the particular key had been pushed. If the key had been pushed, the microprocessor 24, in step 188, would change the information in the key data table to indicate that the key was presently in a non-pushed mode. The microprocessor will then proceed to step 190 to increment the key address for the next scan.

If, in step 186, the microprocessor determined from the key data table that the key had not been pushed previously, the microprocessor would proceed directly to step 190.

After the key address had been incremented, in step 190, and retrieved in step 172, the microprocessor would continue to cycle through the various key addresses until all keys have been scanned.

If in step 182, the input data from the keyboard indicates that the particular key was currently being pushed, the microprocessor will proceed to step 192 to determine from the key data table whether or not the key had been pushed on the previous cycle. If it had, the microprocessor step 194 will check the auto-repeat timer to determine whether or not the time for auto-repeat had elapsed.

If in step 192, the microprocessor determines that the key had not been previously pushed, the microprocessor will proceed to step 196 in which it will test whether or not the hysteresis check had been previously performed on the prior cycle. If not, the microprocessor will proceed to step 178 and conduct hysteresis test, and so on. If the hysteresis test had been performed, the microprocessor will proceed to step 198 to set the key-ready flag to indicate to the microprocessor 24 background program that data was ready to be input into the character buffer from the keyboard. If in step 194, it was determined that the auto-repeat time had elapsed, the microprocessor 24 will proceed to step 198 to set the key-ready flag. If the auto-repeat time had not elapsed, the microprocessor will proceed to step 200 to increment the auto repeat timer. After this step, as well as step 198, the microprocessor would proceed to step 190 to increment the key address, and so on.

In the above manner, whenever a keyboard scan is called for, the microprocessor will cycle through each key address, causing the pulsewidth modulating circuitry, see FIG. 9, to send a pulsewidth modulated serial address string to the keyboard corresponding to each key location. The data received from the keyboard in response to the serial address input, is then used by the microprocessor to update a key data table contained within RAM 30, as well as to initiate a character input operation.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. Apparatus for line-by-line refreshing of a visual display, of the type used in a visual display system and included in a general purpose terminal to display visual information, the visual display system including, character and video generator means to convert display data into visual display information, a data bus, an address bus, visual display means responsive to the visual display information for displaying the visual display information, and clock and synchronizing means for controlling the conversion and display of the display data in the character and video generator means and in the visual display means, wherein the visual information is displayed display-line-by-display-line to form the visual display, and wherein each line has a corresponding sequence of display data, the line-by-line refreshing apparatus comprising:

addressable memory means responsive to a first and second set of addresses for storing the sequences of display data corresponding to each of the display lines of the visual display during a write cycle and at addresses specified in the first set of addresses, and for supplying display data to the character and video generator means during a refresh cycle, which data are supplied from address locations that are specified in the second set of addresses;

first temporary storage and incrementing means connected to the data bus and to the addressable memory means for generating the second set of addresses, wherein the first temporary storage and incrementing means receive a starting address on the data bus for the sequence of display data corresponding to the display line to be refreshed and increment the starting address to form the second set of addresses, which second set includes the addresses for the data within the sequence of display data for the display line being refreshed; and microprocessor means for supplying the sequences of display data and the first set of addresses to the addressable memory means via the data and address buses respectively during the write cycle, for maintaining a starting address table in which is arranged the starting addresses for each sequence of display data for each line of the visual display in the order in which each line is to be refreshed in the visual display means, and for supplying each starting address by way of the data bus to the first temporary storage and incrementing means during the refresh cycle, in accordance with the table, to refresh the visual display on a line-by-line basis and in real time.

2. The apparatus of claim 1, in which each starting address includes a character designation address and character attribute data, wherein each display line comprises a number of scan lines, and further wherein the character and video generator means generate the scan lines for a particular display line in accordance with the display data and a scan line count signal, and further wherein the microprocessor means include means for inserting the starting address of an additional display line into the starting address table and for incrementing the character attribute data corresponding to that address at a predetermined interval and on each refresh cycle, and for decrementing the character atrribute corresponding to a selected display line in the starting address table at the same predetermined interval and on each refresh cycle so that on succeeding refresh cycles the incremented character attribute data for the additional line and the decremented character attribute data for the selected line are supplied by the microprocessor means; the apparatus further including second temporary storage means coupled to the microprocessor means for accepting and storing the character attribute data for the particular display line being refreshed;

counter means which are coupled to the second temporary storage means and responsive to the character attribute data for generating the scan line count signal beginning at a value specified by the character attribute data; and logic means which are responsive to the scan line count signal for supplying a display line interrupt signal to the microprocessor when the scan line count signal reaches a predetermined value, so that the value of the character attribute data determines the number of scan lines which are generated by the character generator means for a particular display line, and so that for consecutive refresh cycles the number of scan lines generated for the additional display line increases while the number of scan lines generated for the selected display line decreases; and so that the visual display has the appearance of shifting smoothly downward from the point of visual display at which additional display line is inserted.

3. The apparatus of claim 2 further including means for modifying the scan line count signal and for supplying the modified scan line count signal to the character and video generator means so that the rate at which the character and video generator means generate the scan lines for a particular display line is one-half the rate at which the scan lines are generated in response to the unmodified scan line count signal.

4. The apparatus of claim 3, wherein the character attribute data further include a select signal which has a single height state and a double height state, and a double height control signal which has a first state during the refreshing of a first display line and a second state during the refreshing of the next display line when a double height display is desired, and wherein the counter means further provides a second count which is incremented at one-half the rate of the scan line count, and further wherein the modifying and supplying means comprise adder means responsive to the double height control signal and to the second count for generating the modified scan line count signal by modifying the second count in accordance with a quantity specified by the state of the double height control signal, wherein the modified scan line count signal corresponds to the second count when the double height control signal is in the first state and wherein the modified scan line count signal corresponds to the second count, which has been increased by a nonzero quantity, when the double height control signal is in the second state; and means responsive to the double height select signal for connecting the modified scan line count to the character and video generator means when the select signal assumes the double height state and for connecting the unmodified scan line count when the select signal assumes the single height state.

5. The apparatus of claim 4 wherien the character and video generator means are responsive to a count sequence and generate a sequence of scan lines for each display line which is to be refreshed in the visual display; and further wherein the count sequence has a specified number of consecutive counts, and further wherein the modified scan line count signal corresponds to the first half of the specified number of consecutive counts in the count sequence when the double height control signal is in the first state and corresponds to the remainder of the specified number of consecutive counts in the count sequence when the double height control signal is in the second state.

6. Apparatus for serially scanning a keyboard included in a general purpose data terminal, the keyboard including a plurality of keys, wherein each key corresponds to a unique key address and generates a key state signal which indicates whether it is pressed, and further wherein the apparatus is coupled to the keyboard through an address line and a data line, the serial scanning apparatus comprising:

means for converting the key address into a pulsewidth modulated serial address stream and for supplying the modulated address stream to the keyboard by way of the address line;

logic means which are responsive to the pulsewidth modulated serial address stream from the address line for demodulating the pulsewidth modulated serial address stream to extract the key address therefrom;

decoder means responsive to the demodulated key address for connecting the key corresponding to the demodulated key address to the data line so that the key state signal from the addressed key is provided on the data line; and microprocessor means for sequentially generating the key address for each key, for receiving the key state signal for each corresponding key on the data line, and for maintaining a table of the key states for each key from prior keyboard scans.

7. The apparatus of claim 6, wherein the general purpose terminal is physically separated from the keyboard, and further wherein the converting means and the microprocessor means are located in the general purpose terminal while the logic means and the decoder means are located in the keyboard.

8. The apparatus of claim 7, wherein the pulse-width modulated serial address stream has a predetermined period and varies within the predetermined period between a first and second state and further wherein the logic means include means responsive to the pulsewidth modulated serial address stream for generating a clock which has a pulse portion of predetermined pulsewidth and a period which is substantially equal to the period of the pulsewidth modulated serial address stream, and means for determining the state of the pulsewidth modulated serial address stream during the pulse portion of the clock for each of a predetermined number of consecutive clock periods to derive a sequence of states from the pulsewidth modulated serial address stream, whereby the sequence of states corresponds to the key address of a particular key, in serial form.

9. A general purpose terminal system, which includes keyboard means, and visual display means which are cyclically refreshed, the general purpose terminal system comprising:

means for pulsewidth modulated serial scanning of the keyboard;

line refreshing means for supplying, in real time, an address for each data line which is to be refreshed in the video display;

smooth scrolling double height means for incrementally altering the refresh data line address so that a different number of scan lines appear on subsequent visual display refresh cycles;

controller means which are coupled to the pulsewidth modulated serial keyboard scanning means, the line refreshing means, and the smooth scrolling means, for supplying address data to, for receiving interrupt and control data from, and for controlling all of the above.

10. Apparatus for line-by-line refreshing of a visual display during a refresh cycle, of the type included in a general purpose terminal, the general purpose terminal including character and video generator means to convert display data into visual display information for display on a visual display means, clock and synchronizing means for controlling the conversion of the display data and the display of the visual display information in the character and video generator means and the visual display means respectively, a data bus, and an address bus, wherein the visual information is displayed character line-by-character line, wherein each character line includes a plurality of characters arranged in a sequence, the apparatus comprising addressable memory means coupled to the address bus and to the data bus for storing the display data corresponding to each character line, wherein the display data are received on the data bus and stored according to a first set of addresses which is received on the address bus during a write cycle, and for providing the display data for each character line to the character generator and video generator means in accordance with a second set of addresses, wherein the second set of addresses correspond to the character line being refreshed during the refresh cycle;

microprocessor means coupled to the data bus and to the address bus for providing the display data and first set of addresses to the addressable memory means during the write cycle, for maintaining a character line starting address table in which character line starting addresses are arranged in the order in which each character line is to be refreshed in the visual display means, and for supplying each character line starting address on the data bus during the refresh cycle, in real time, and in the order specified in the character line starting address table; and means coupled to the data bus and to the character and video generator means for receiving the character line starting addresses from the microprocessor means during the refresh cycle and for incrementing each character line starting address in the order received on the data bus for a predetermined number of iterations to generate the second set of addresses, whereby the addressable memory means supply the display data corresponding to the characters in each character line, in sequence, to the character and video generator means when the second set of addresses are supplied to the addressable memory means by the receiving and incrementing means, so that the visual display is refreshed on a line-by-line basis.

11. The apparatus of claim 10 in which each character line starting address includes a character designation address and character attribute data, the character attribute data for each character line having a nominal value of one, and wherein each character comprises a number of scan lines, and further wherein the character and video generator means generate the scan lines for a particular character line in accordance with a scan line count signal in which a full scan line count spans a pre-determined count range, the apparatus further including means coupled to the data bus and responsive to the character attritube data for generating the scan line count signal, wherein the scan line count signal begins at a value specified by the character attribute data so that the scan line count signal generated by the character and video generator means includes less than a full scan line count and so that fewer than all of the scan lines for the corresponding character line are generated by the character and video generator means; and further wherein the microprocessor means include means for inserting an address for an additional character line into the character line starting address table, wherein the corresponding character attribute data has a value greater than one, for incrementing the character attribute data in a selected character line address by a predetermined amount on each refresh cycle which character line address is already in the starting address table, and for decrementing the character attribute data for the additional character line by the same predetermined amount of each refresh cycle, so that an increasing number of scan lines are displayed for the additional character line and a decreasing number of scan lines are displayed for the selected character line over several refresh cycles, and so that the character lines between the additional character line and the selected character line appear to shift smoothly downward over the several refresh cycles.

12. The apparatus of claim 11, wherein the character designation address for the additional character line corresponds to a blank line so that a blank line is inserted into the visual display over the several refresh cycles.

* * * * *